Fig. 1.

C. BRYNOLDT.
MOLD APPARATUS FOR CONCRETE BRIDGES AND THE LIKE.
APPLICATION FILED APR. 13, 1920.

1,402,143.

Patented Jan. 3, 1922.
8 SHEETS—SHEET 7.

WITNESS:
Gustav Genzlinger.

INVENTOR
Christian Brynoldt
BY
Lynnestvedt & Lechner
ATTORNEYS

UNITED STATES PATENT OFFICE.

CHRISTIAN BRYNOLDT, OF PITTSBURGH, PENNSYLVANIA, ASSIGNOR TO BLAW-KNOX COMPANY, A CORPORATION OF NEW JERSEY.

MOLD APPARATUS FOR CONCRETE BRIDGES AND THE LIKE.

1,402,143.  Specification of Letters Patent.  Patented Jan. 3, 1922.

Application filed April 13, 1920. Serial No. 373,527.

*To all whom it may concern:*

Be it known that I, CHRISTIAN BRYNOLDT, a citizen of the United States, residing at Pittsburgh, in the county of Allegheny and State of Pennsylvania, (his post-office address being % Blaw-Knox Co., Pittsburgh, Pennsylvania,) prays that Letters Patent may be granted to him for the new and useful Improvements in Mold Apparatus for Concrete Bridges and the like, of which the following is a specification.

This invention relates to form apparatus for constructing concrete bridges and other structures well above the ground.

The primary objects of my invention are to simplify, expedite and lower the cost of the construction of bridges and similar structures well up from the ground; to provide improved molding apparatus so constructed that the work can be carried out progressively with a minimum amount of equipment, the major portion of the apparatus being adapted to be taken down after a short interval of time and reused, only those portions being left in position as are necessary to support the concrete until set; to provide improved means for handling the mold forms in the air; and to provide an improved collapsible floor or deck mold form adapted to be telescoped through the work.

In general, my invention contemplates the construction of structures of the character described by means of the more or less permanent reusable mold apparatus, technically known as mold "forms," in place of built up or false work molds, erected on the ground, left in place until the concrete sets and then torn down. In this respect, another object of my invention is to provide improved form apparatus which may be readily accommodated, within practical limits to variations in dimensions.

I accomplish the foregoing, together with such other objects as may hereinafter appear, by means of a construction which I have illustrated in preferred form in the accompanying drawings, wherein—

Figure 1:
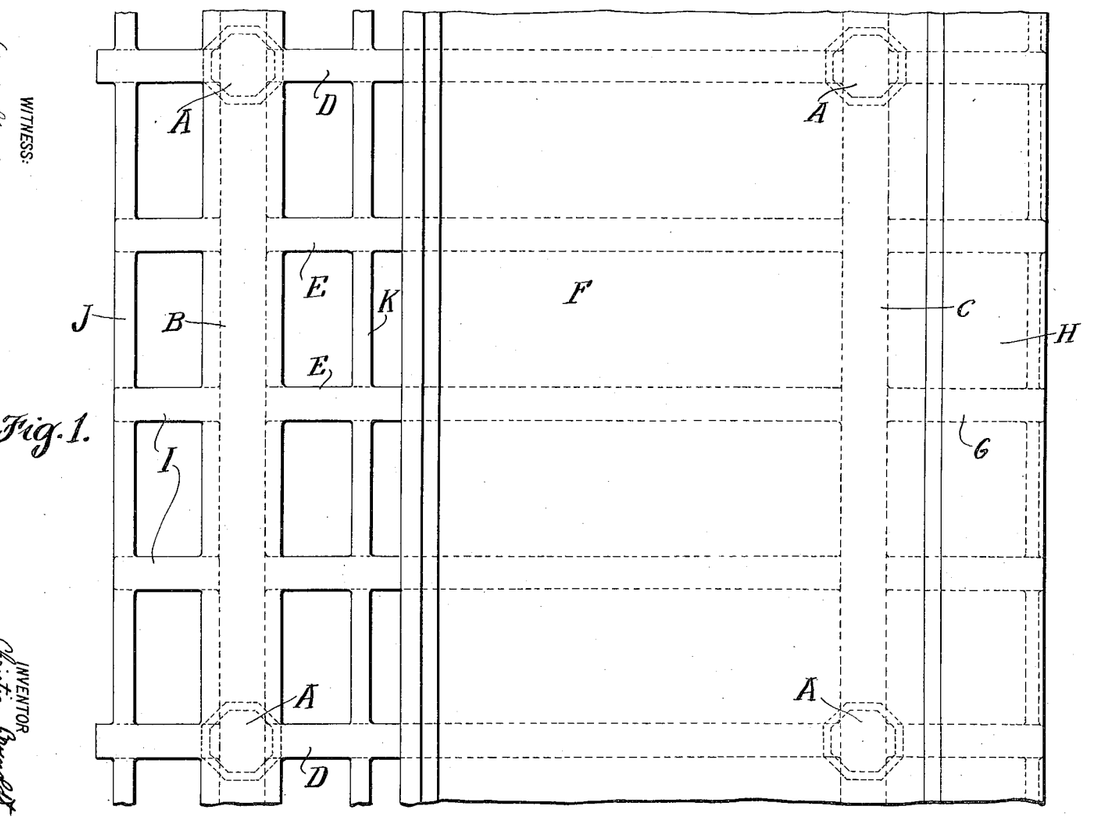
Figure 1 is a plan view of a portion of a bridge of more or less conventional design.

My invention will be best understood if the general construction of concrete bridges is had in mind, and with this in view I have illustrated a typical bridge construction in Figure 1.

On reference to this figure, it will be seen that the bridge comprises a number of concrete columns A; the pair of longitudinal concrete girders B and C, carried on the columns; the concrete cross beams D extending cross ways of the bridge and over the columns, serving with the girders to keep the tops of the columns rigid; the intermediate cross beams e, usually of lighter construction than the cross beams D, such beams being carried by the longitudinal girders B and C; and the floor or deck F.

This in general represents the standard practice in concrete viaduct construction. In some instances, however, concrete cantilevers G project out laterally from one or both of the longitudinal girders for the purpose of carrying the sidewalk H; and where, as shown, provision is made for street railway or railroad tracks along one side of the bridge cantilevers I are provided for supporting a longitudinal beam or girder such as is indicated at J. A companion girder K is carried by the cross beams D and E.

The concrete columns are ordinarily between 20 and 60 feet high and they are generally spaced apart crosswise of the bridge from 20 to 40 feet, the cross beams usually being from 10 to 15 feet apart. The load and form supporting apparatus will now be described.

Figure 7:
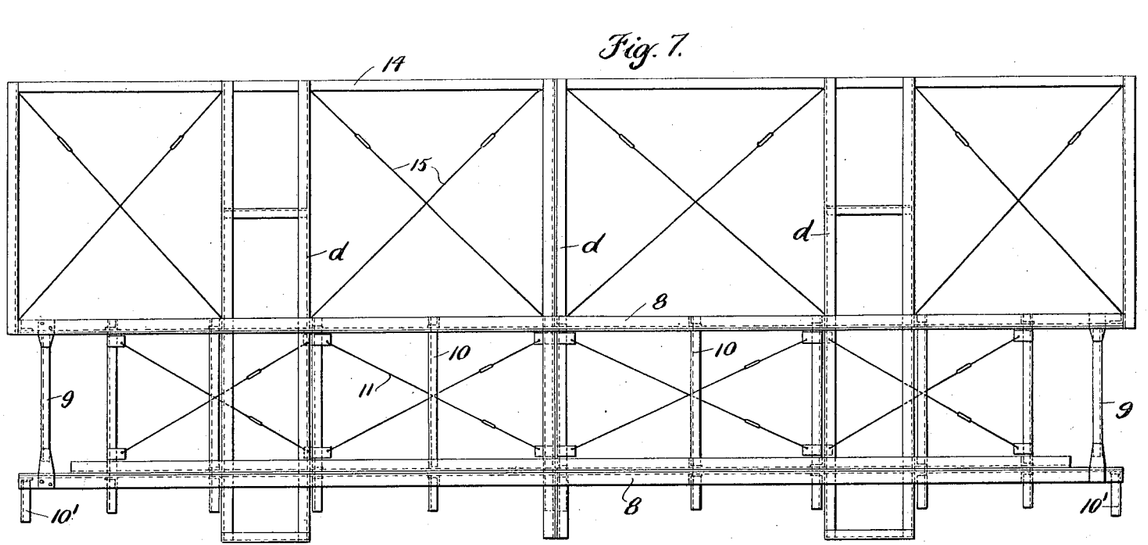
Figures 7 and 8 are respectively a plan view and side elevation of certain trusses forming a part of my improvement.
Figure 8:
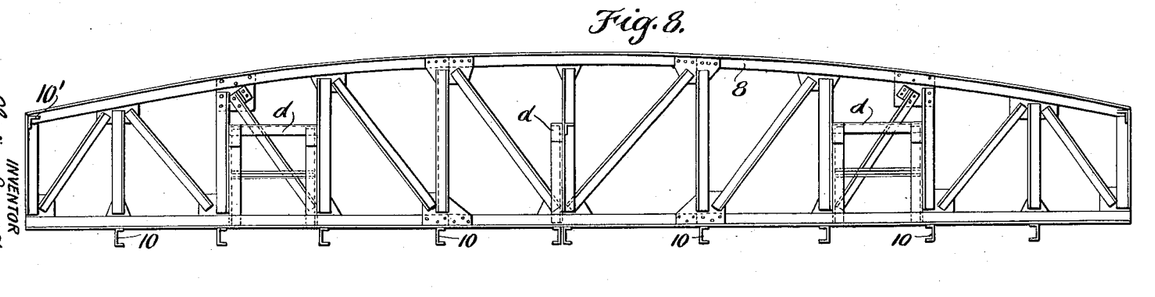

A bracket $a$ is provided for each column, such bracket, where the columns are of considerable height being supported from the column mold or from the column itself, as illustrated in my copending application Serial No. 373,530, filed April 13, 1920, and where the columns are relatively low and other conditions permit, such as good footing, the brackets may be supported from the frames or bents 7, as shown in the drawings. Extending longitudinally of the bridge and between adjacent columns are pairs of trusses 8 which are supported on the brackets $a$, one truss being located on each side of the columns. The pairs of longitudinal trusses are secured together and braced by means of cross pieces 9 and 10 and diagonal tie rods 11, as illustrated in Figure 7, it being further understood that the trusses are composed of sections, each of which is constructed from a plurality of angles or similar members suitably coupled together by means of gusset plates; the sections being bolted together, all as shown in Figure 8. It will be noted that the cross pieces 10, which are preferably in the form of channels, project inwardly beyond the inside longitudinal truss 8, this arrangement being provided in order to secure a support for the rails 12, the purpose of which will hereinafter appear. At the ends the inside longitudinal trusses 8 are provided with short laterally projecting members 10′ which are adapted to be connected to the channels 13, carried on brackets $b$ and $c$, the purpose of which will hereinafter be set forth. The channels 13 thus serve to connect adjacent ends of pairs of trusses. Intermediate their ends the pairs of longitudinal trusses 8 are provided with a plurality of suitably spaced brackets $d$. These brackets extend through their respective pair of longitudinal trusses and their inner ends project slightly beyond the inside longitudinal truss while the outer ends extend well beyond the outside longitudinal truss of a pair of trusses. The outwardly projecting portions of the brackets $d$ serve as a means for supporting the concrete cantilevers and the apparatus for molding the same. These outwardly projecting portions of the brackets are braced by the framing 14 and the diagonal tie rods 15. The brackets $d$ are shown in plan view in Figure 7, in end elevation in Figure 8 and in side elevation in Figure 15.

The brackets $b$ and $c$ which correspond to the brackets $d$ come opposite the columns. They are carried on the brackets $a$ and they are tied together by means of the tie rods 16 which are passed through the channels 13, one being located on each side of a column.

The brackets $c$ assist in supporting the concrete cantilevers and the apparatus for molding the same.

The brackets $b$ together with the inwardly projecting portions of the brackets $d$ serve as a means for supporting the steel cross beams $e$, which, like the longitudinal trusses 8 are composed of sections each constructed from angles or similar structural members.

The steel structure just described carries all of the concrete and serves to support the molds proper which will now be described.

The bottoms of the beams or girders B and C are molded by the lagging 18 which is carried on the top chords of the pairs of steel trusses 8. (See Figures 2, 3 and 15.) The side mold sections for the girders are in turn supported from the lagging.

Figure 4:
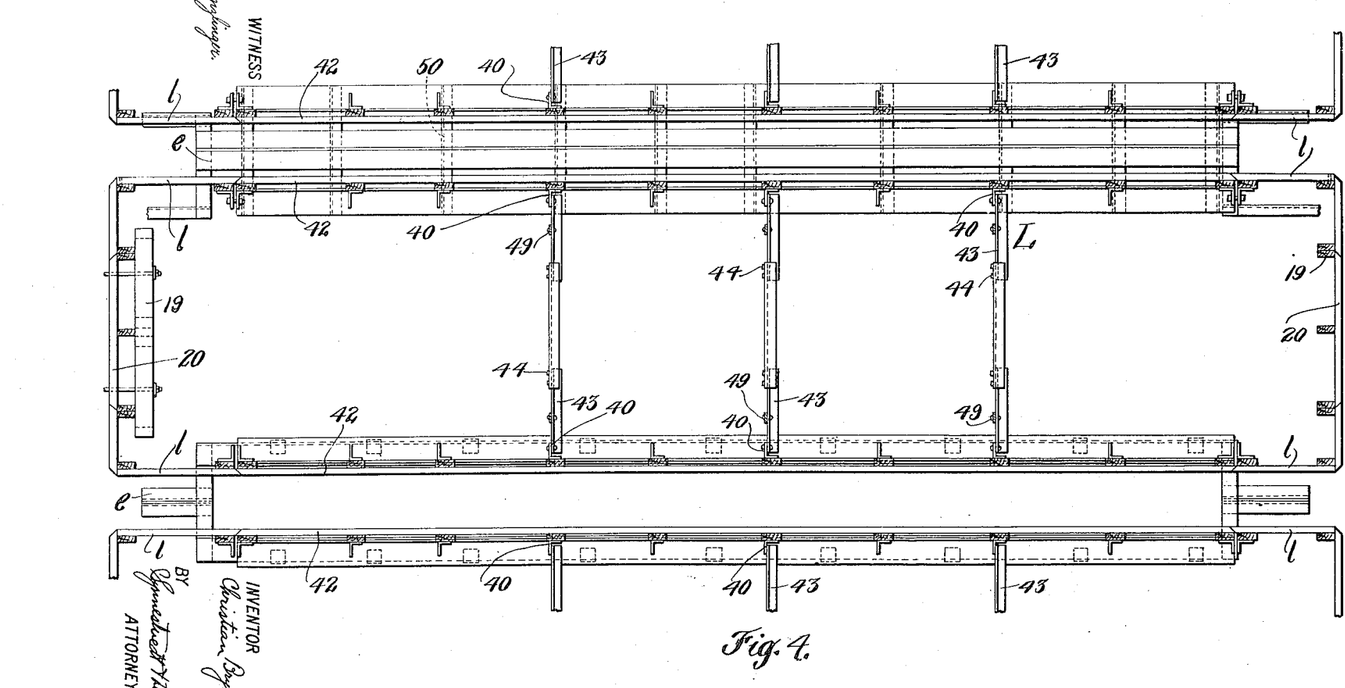
Figure 4 is a horizontal section taken through Figure 2 on the line 4—4 thereof.
Figure 9:
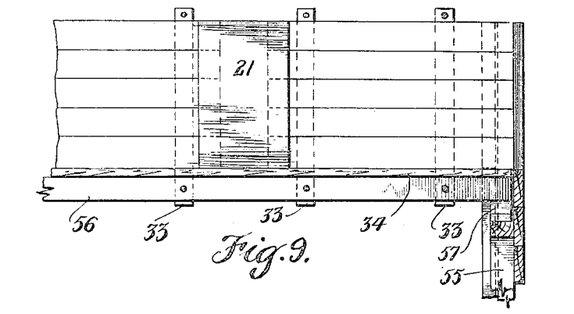
Figure 9 is a section taken through a beam mold forming a part of my invention; said section being taken on the line 9—9 of Figure 10 and Figure 11.
Figure 10:
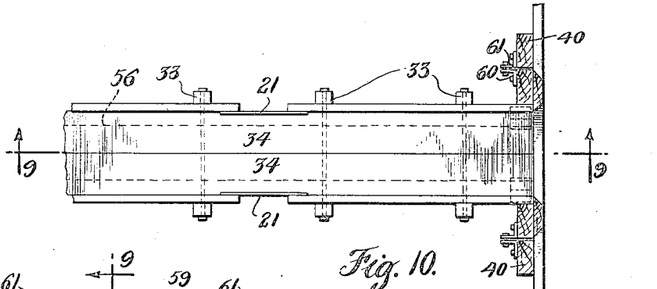
Figure 10 is a plan view of Figure 9.
Figure 11:
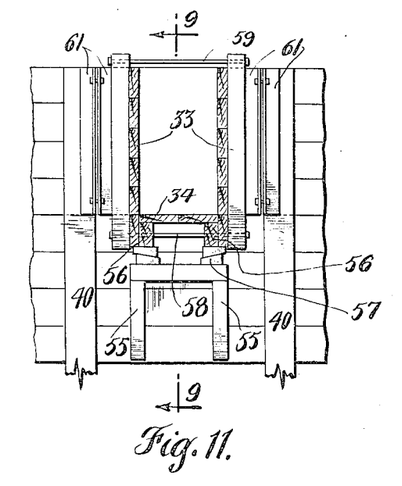
Figure 11 is a cross section taken through the beam mold shown in Figures 9 and 10.

The side mold sections consist of suitable framing 19, faced with lagging 20, and they are made in sections as shown in Figure 4, for example, or similar to the beam mold shown in Figures 9, 10 and 11, in which case the gaps between sections would be closed by the filler plates 21. (See Figure 9.) By this latter means the side mold sections may be accommodated to the construction of girders of varying spans. At the bottom, the side mold sections are supported as against inward displacement by means of the corner pieces 22 and the boards or blocks 23 secured to the lagging and extending longitudinally thereof, the sections being jammed against the corner pieces 22 by means of wedges 24. (See Figure 2.) At the top the side mold sections for the girders B and C are supported by means of the tie rods or spacers 25′.

Referring now to the concrete cross beams E and the flooring or deck slabbing F, it will be seen that the bottoms of the beams E are molded by the bottom mold sections 25 which are carried on the steel cross beams $e$ which as before pointed out, are in turn carried on the brackets $b$ and $d$. The sides of the beams E and the slabbing are molded by the box frames L. These box frames as will later appear, are extensible, collapsible, variable in depth and capable of being canted or cocked. The box frames are supported from the steel cross beams $e$ as will hereinafter be pointed out.

The box frames L also serve to mold a portion of the sides of the concrete cross beams D which extend between columns cross ways of the bridge, the remainder of such beams being molded by the side sections 26 (which are constructed in the same general manner as the side sections 19 for the girders B and C) and by the bottom mold sections 27. The bottom section 27 is supported from the angles 28 carried by the steel cross beams $e$ of which there are a pair for the concrete beams D instead of single steel cross beams as are used for the intermediate concrete cross beams E. (See Figure 3.) The level of the steel cross beams $e$ may be adjusted by means of the wedges 29. Any discrepancy in depth in the sides of the box frames which mold the transverse beams D may be made up by means of filler pieces 30.

Figure 2:
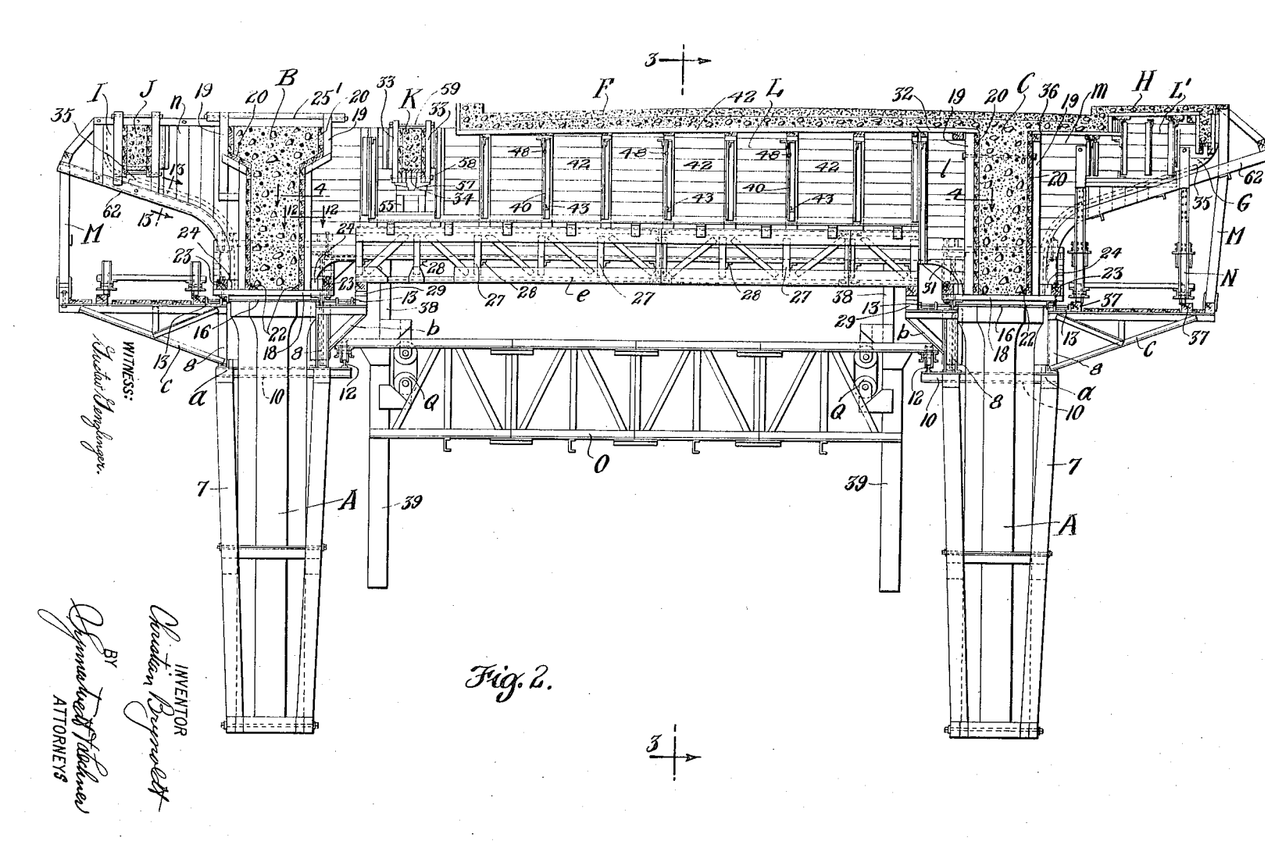
Figure 2 is a transverse section through the bridge showing the mold apparatus in position, said section being taken on the line 2—2 of Figure 3.
Figure 3:
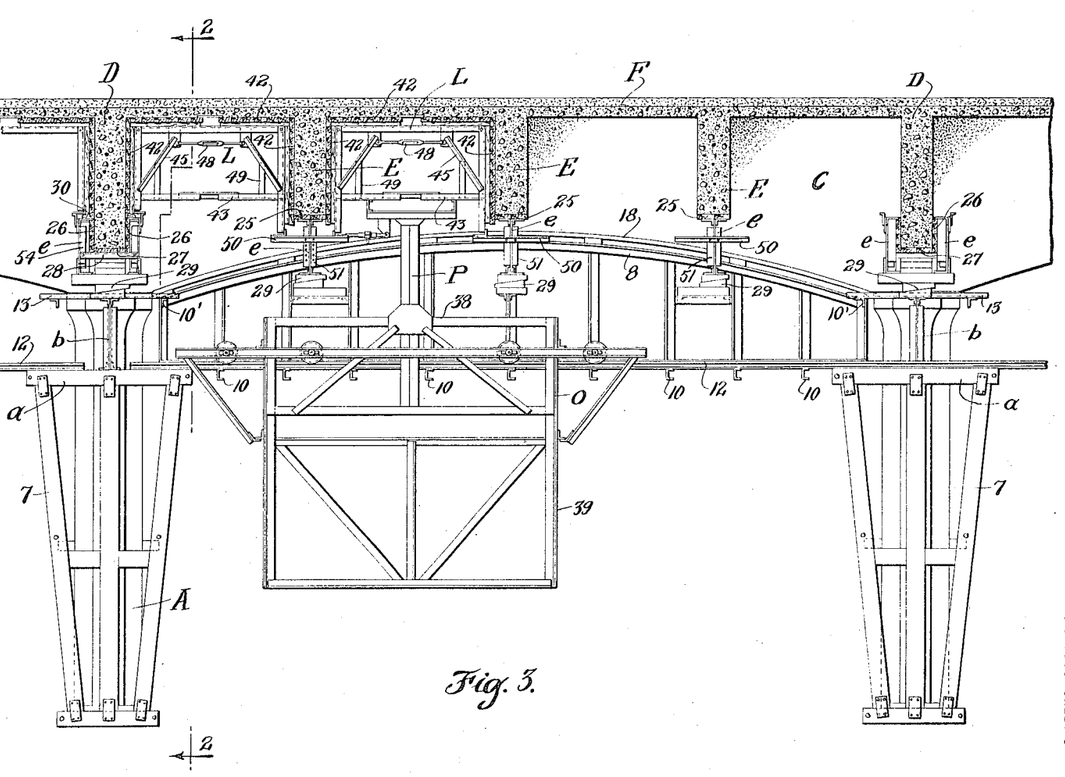
Figure 3 is a longitudinal section through a portion of the bridge, taken on the line 3—3 of Figure 2.
Figure 12:
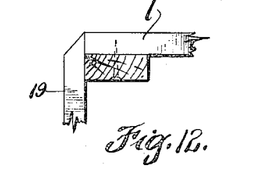
Figure 12 is a section taken on the line 12—12 of Figure 2.

It will be noted that the box frames L terminate short of the girder mold sections. The gaps are closed as follows: Side sections $l$, consisting of framing and lagging, are bolted to the ends of the sides of the box frame L as indicated in Figure 2. These side sections $l$ make joint with the side sections 19 and the girder mold, in the manner indicated in Figure 12. The bottom of the mold formed by the side sections $l$ is closed by means such as the arcuate members 31. (See Figure 2). In places where the slabbing extends over the side sections $l$, the mold is completed by means of a floor mold section 32 which is supported from the adjacent mold sections.

The mold for the beams K consists of side sections 33 and a bottom section 34 which, as will hereinafter be pointed out, are supported from the sides of the box frames L.

The cantilevers are supported as follows, reference being first had to those cantilevers which carry the side walk H. The brackets $c$ and $d$ carry a frame work M from which the side sections $m$ and the bottom 35 of the cantilever mold are supported. Box frames L′, similar in construction to the box frames L, complete the side portions of the cantilever mold and also serve to mold the side walk slabbing. The side sections $m$ make joint with the box frames L′ and also with the outside side sections 19 of the mold for girder C, and the slabbing over the side sections $m$ is molded by a floor mold section 36 supported on the side sections 19 and on the section $m$. The box frames L′ are supported on a traveller, indicated as a whole at N, such carrier riding on tracks 37 supported on the brackets $c$ and $d$.

The cantilevers on the track side of the bridge are molded by side sections $n$ which make joint with the side sections 19 of the mold for the girder B and by the bottom mold section 35, such sections being supported from the frame M. The beams J have a mold constructed similarly to the mold for the beams K.

In order to handle the box frames L and the other inside mold parts, I provide a traveller O which is sectional in construction and which rides upon the rails 12, such traveller being provided with a platform or elevator mechanism P, the platform being provided with downwardly depending posts 38 which slide in guide ways 39 and being raised and lowered by any suitable mechanism such as the block mechanism Q. It will be understood that the platform P is approximately coextensive with the box frames L in length.

The traveller is utilized to support the box frames in position until supported from the steel cross beams $e$ and serves to support the box frames when collapsed for lowering and for shifting to a new point of use.

From this brief description, the general character of my improvements will be understood and a description will now be given of certain details of the apparatus.

Figure 5:
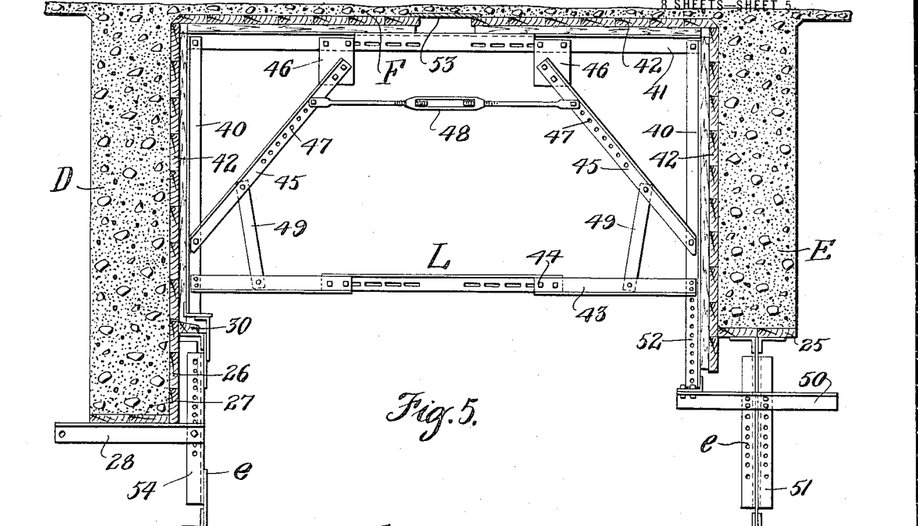
Figures 5 and 6 are enlarged sectional views illustrating an adjustable, collapsible and extensible mold form used in carrying out my invention.
Figure 6:
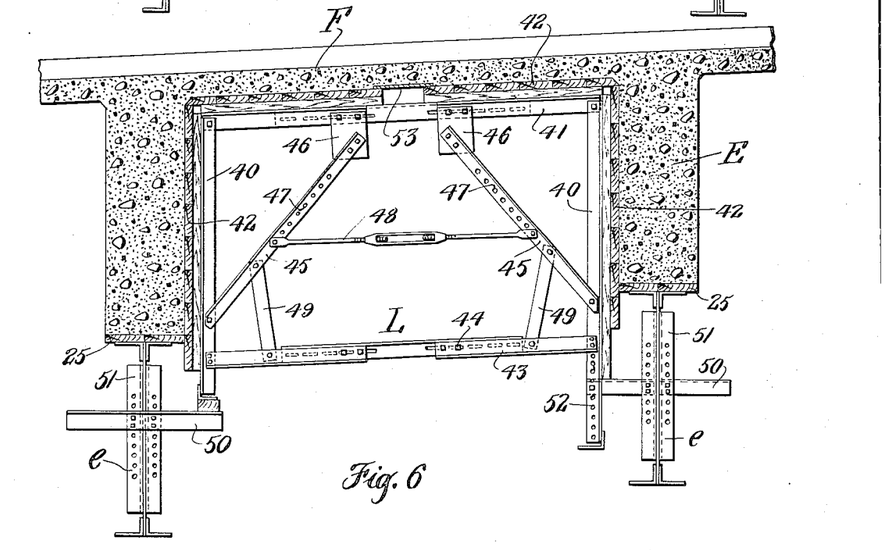

The box frames L are illustrated more in detail in Figures 4, 5 and 6, to which attention is directed. Each box comprises two side frames 40, and a top frame 41, to which lagging 42 is secured. The three frames are pivotally joined together and the side frames are spread apart and braced at the bottom by menas of a plurality of suitably spaced extensible braces 43, each preferably consisting of three members, the middle one of which is provided with a plurality of slots or openings adapted to receive bolts or other securing members 44 carried on the inner ends of the outer members. The upper frame 41 is also composed of a plurality of such three-part members, the middle one of each of which is similarly slotted to operate in the same manner. The box frames are further braced by a plurality of suitably spaced diagonal braces 45 which are pivoted at one end to the side frames 40, their opposite ends being secured to brackets 46 carried on the inner ends of outer members of the upper frame. The diagonals 45 are provided with a plurality of holes 47 to adjustably receive the turnbuckles 48. Links 49 connect the diagonals 47 to the braces 43.

By virtue of the arrangement just described, the boxes are variable in width to suit differences in the distance between beams. The boxes may also be cocked as shown in Figure 6 to accommodate the boxes to the construction of inclined portions of the bridge structure, such for example as the approaches. In Figure 5 the box frame is shown with maximum extension, and in Figure 6 the minimum width is shown.

The side frames or walls of the box frames are supported on angles 50 and a compound adjustment as to elevation may be secured by adjusting the elevation of the angles 50, for which purpose the end angles 51 secured to the steel cross beams $e$ are provided with a plurality of holes, and by adjusting the relative position of the side frames 40 of the box frame with reference to the angles 50, for which purpose the frames are provided with a plurality of holes 52. The possibilities for adjustment provided by this arrangement are illustrated in Figures 5 and 6. It will, of course, be understood that the depth of lagging is increased or decreased dependent upon the depth of the cross beams E, the depth of the cross beams being determined by the elevation of the steel beams e as fixed either by the wedges 29, hereinbefore described, or by increasing the thickness of the bottom mold sections 25, as, for example, by doubling the boards.

To take care of the gap in the lagging for the floor slabbing which is always left between sections in order to permit of the collapse of the frames, I provide filler strips 53. In order to make provision for variation in depth of the concrete beams connecting the columns transversely of the bridge, I provide the pairs of steel beams e, located at such points, with angles 54 having a plurality of bolt holes, by means of which the elevation of the angles 28 supporting the bottom mold section 27 may be varied.

The abutting ends of the box frames and the sections l are bevelled off in such manner as to permit the box frames to be readily collapsed. The members comprising the girder mold side sections are similarly bevelled so that the middle sections may be readily retracted which makes it possible to freely remove the end members thereof as well as the sections l.

Attention is now directed to Figures 9, 10 and 11 which show the construction of the beam molds for the beams J and K. These molds are composed of spaced pairs of side mold sections 33, each consisting of a frame and lagging, and the bottom mold section 34, the sections being preferably supported as follows:

Secured to each side mold section of a box frame, at a point below the beams, is a bracket 55 and stringers 56, extending across the box frame, are supported thereon through the medium of wedges 57, by means of which the elevation of the stringers, and therefore of the bottom mold section 34, may be varied. If the side sections 33 extend below the level of the bottom mold section 34, tie rods 58 are passed through the side sections and the stringers 56, such tie rods serving to clamp the bottom portions of the side sections against the bottom sections, and at the same time to support the side sections. The side sections are supported at the top by means of tie rods 59. The outer ends of the mold sections 33 are bevelled to make joint with the bevelled edges of the box frame side mold sections 40 in order that the beam mold sections may be readily removed. The beam mold side sections are further supported by providing angles 60 at their outer edges, such angles being adapted to be detachably bolted to the angles 61 secured to the frames 40. The gap left between the members 33 to permit of the collapse of the sections for removal is closed by means of a filler plate 21.

Figure 13:
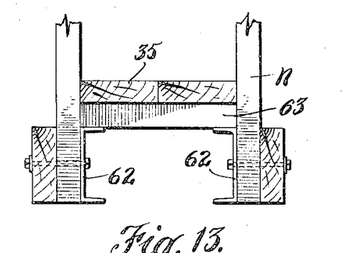
Figure 13 is a section taken on the line 13—13 of Figure 2.

Attention is now directed to Figure 13 which shows the manner in which the mold sections for molding the concrete cantilevers are supported.

At points beneath the cantilevers, the frame work M is provided with pairs of spaced channels 62 to which the side mold sections m for the cantilevers are bolted. The mold sections 35 which serve to mold the bottom and also the outer ends of the cantilevers are supported from the channels 62 through the medium of spacer blocks 63. In this connection it is to be observed that the channels 62 are so located as to take care of variations in the depth of the cantilevers, the elevation of the mold sections 35 being altered by the insertion, where necessary, of spacer blocks, the depth of such blocks varying to suit the particular conditions to be met. Where there is no floor slabbing, the mold sections m are secured at the top by tie rods as before. The steel cross beams e, the traveller O, and the platform P, since they are all of sectional construction, may be accommodated to differences in dimension cross wise of the bridge by adding or taking away sections or replacing sections with others of different dimensions, and similarly the longitudinal trusses 8 may be altered in length. The box frames are preferably constructed with given longitudinal dimensions as they must have the capacity of being telescoped through the work and to provide for variations in the length of the concrete cross beams, side sections l of different lengths are used.

Figure 14:
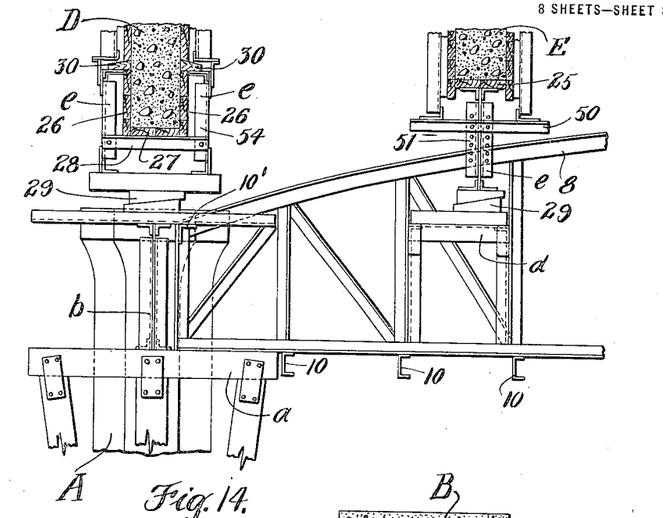
Figures 14 and 15 are views illustrating details of my improvements.

It will also be apparent that where the variation in the distance between spans is slight, it will not be necessary to remove a section from the longitudinal trusses, but the ends of the trusses may be carried past the columns, as shown for example, in Figure 14, this being possible by virtue of the fact that the pairs of longitudinal trusses lie clear of the columns and may be supported on the brackets a at any point from the vertical center line of the post to the edges of the brackets. Where the longitudinal trusses occupy a position with reference to the columns such as illustrated in Figure 14, for example, the position of the steel cross beams e may correspondingly vary with respect to the brackets b, and it is to make provision for such contingencies that the brackets b are of considerable width.

Figure 15:
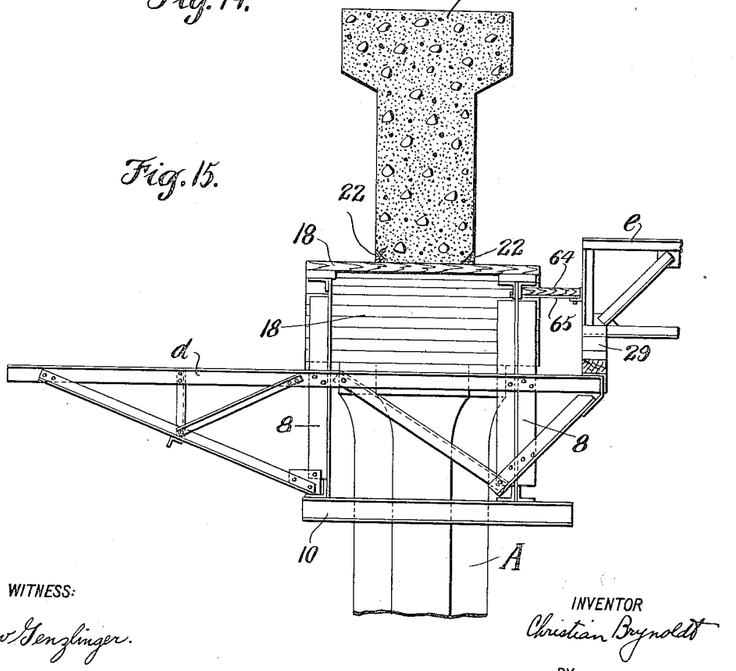

In Figure 15 I have illustrated one means for supporting the steel cross beams e as against displacement relative to the longitudinal steel girders H. From inspection of this figure it will be noted that I interpose a spacing block 64 between the ends of the steel cross beams and the longitudinal girders, such blocks being supported on the tie rods or bolts 65 which also serve to position the parts. It will be noted that the pairs of steel cross beams *e* form part of the mold for the beams D.

From the foregoing, the operation of the apparatus will be readily understood. With the longitudinal steel trusses 8, the brackets *b*, *c* and *d*, and the travellers in place, the steel cross beams *e*, the box frames, and other parts too heavy to be shifted by hand, may be set up. After the concrete has been poured and has set for several days, practically all of the forms may be taken down, leaving the longitudinal steel trusses, the steel cross beams *e* and the bottom mold sections 35 of the cantilivers, in place, these being sufficient to support the concrete until it has become thoroughly set. In the meantime the mold apparatus taken down may be shifted to a new point of use by the travellers and set up.

The mold forms may be taken down in a number of different ways and the following method is merely illustrative. The beam molds for the beams J and K are first taken down by removing the bolts securing the angles 60 and 61 together and taking out the tie rods 59 and 58, after which the side sections 33 may be collapsed toward each other freeing the outer ends thereof from the side sections 40 of the box frames and the side sections *n* respectively. The sections 33 may then be dropped and placed on one of the travellers.

With the mold sections for the beam K out of the way, the box frames L may be collapsed and lowered by means of the platform P and then telescoped through the work and again set up. The side sections *l* and the members comprising the side sections 19 of the girder mold may be taken down and shifted to the new point of use. It will, of course, be understood that previous to taking down the box frames, the bolts which connect the box frames and the sections *l* are removed, as are the tie rods 25 and the other members serving to position the side mold sections 19.

With the mold sections for the beam molds J removed, the side mold sections *n* and the outside mold sections 19 of the concrete girder B may be removed and shifted by means of the traveller. Similarly the box frames L' forming the side walk may be collapsed and lowered, the mold sections *m* and the outside mold sections 19 of the concrete girder C may be taken down and shifted by the traveller.

It will be seen from the foregoing that I have not only provided a convenient means for handling and setting up mold forms high in the air, but have utilized certain portions of the supporting steel structure as a means for supporting the travellers. Furthermore I have evolved apparatus whereby I can construct structures of the character described with permanent, reusable mold forms, by the use of which I am enabled to carry out the work with a minimum amount of equipment and reduce the time and labor involved as compared with the ordinary methods heretofore followed in which wooden molds, supported by elaborate falsework and erected in place and left standing until all of the concrete has thoroughly set, are used. It will also be seen that the apparatus, within practical limits, accommodates itself to a variety of different conditions arising out of changes in dimension and in inclination, and the like.

I claim—

1. Mold apparatus for concrete bridge structures and the like comprising load supporting means, a traveller movably supported therefrom, and take down mold sections supported from said supporting means and adapted to be handled on the traveller.

2. Mold apparatus for concrete bridge structures and the like comprising load supporting means, a traveller movably supported therefrom, and a collapsible mold form supported from said supporting means adapted to be handled by the traveller.

3. Mold apparatus for concrete bridge structures and the like comprising load supporting means, a traveller movably supported therefrom, and a collapsible mold form supported from said supporting means adapted to be handled by the traveller and to be telescoped past the work.

4. Mold apparatus for concrete bridge structures and the like comprising in combination supporting means, take down mold sections adapted to be supported thereby, and a traveller suspended in the air from the supporting means for movement relative to the structure.

5. Mold apparatus for concrete bridge structures and the like comprising load supporting means, a traveller longitudinally movably supported therefrom, and a collapsible mold form supported from said supporting means adapted to be handled by the traveller, said traveller having a portion thereof substantially vertically movable.

6. Mold apparatus for concrete bridge structures and the like comprising load supporting means forming part of the mold, a traveller movably suspended therefrom, and take down mold sections completing the mold supported from said supporting means and adapted to be handled on the traveller.

7. Mold apparatus for concrete bridge structures and the like comprising in combination supporting means adapted to be left in position until the concrete has thoroughly set, take-down mold sections supported therefrom adapted to be taken down a relatively brief interval after pouring, and a movably supported-traveller for handling the sections suspended from said supporting means.

8. Mold apparatus for concrete bridge structures and the like comprising in combination supporting means, a track inside the columns of the bridge and carried from said supporting means, a traveller mounted on said track, and take down mold sections adapted to be handled on said traveller.

9. Mold apparatus for concrete bridge structures and the like comprising in combination supporting means, a track inside the columns of the bridge and an outside track, each supported from said means, a traveller for each track and take-down mold sections adapted to be handled on said travellers.

10. Mold apparatus for concrete bridge structures and the like having columns comprising in combination longitudinal supporting beams between columns, transverse supporting beams removably supported by the longitudinal beams, and take-down mold sections adapted to be supported from the beams.

11. Mold apparatus for concrete bridge structures and the like having columns comprising in combination longitudinal supporting beams, tracks supported from said beams, a traveller on the tracks, and take down mold sections adapted to be handled on the travellers.

12. Mold apparatus for concrete bridge structures and the like having columns comprising a longitudinal supporting beam, a rail supported from said beam, a traveller riding on the rail and take down mold sections adapted to be handled on the traveller.

13. Mold apparatus for concrete bridge structures and the like having columns comprising in combination a longitudinal supporting beam, a plurality of bracket-like members on the beam, a rail carried by said members, a traveller riding on the rail, and mold sections adapted to be handled on the traveller.

14. In mold apparatus for concrete bridge structures and the like having columns, the combination of longitudinal supporting means and transverse supporting means supported clear of the ground, mold form sections, and a traveller movable longitudinally of the bridge between the columns.

15. In mold apparatus for concrete bridge structures and the like having columns, the combination of longitudinal supporting means and transverse supporting means supported clear of the ground, mold form sections, and a traveller movable longitudinally of the bridge between the columns, said mold sections being adapted to be lowered past the supporting means.

16. In mold apparatus for concrete bridge structures and the like the combination of longitudinal supporting means and laterally extending supporting means supported to permit a traveller to be shifted substantially thereunder, a traveller, and mold form sections adapted to be lowered past said supporting means onto the traveller.

17. In mold apparatus for concrete bridge structures and the like, a box frame composed of sections hinged together to permit the sections to be canted.

18. In mold apparatus for concrete bridge structures and the like, a box frame composed of a plurality of sections and means for securing the sections together constructed to permit of the collapse, extension or diminution, or canting of the sections.

19. In mold apparatus for concrete bridge structures and the like, the combination of a supporting means forming a part of the mold, a box frame cooperating therewith and means whereby the frame is carried by the supporting means for vertical adjustment, said frame being composed of sections secured together for extension, diminution and collapse.

20. In mold apparatus for concrete bridge structures and the like a collapsible beam mold comprising a plurality of mold sections spaced apart longitudinally, means for closing the gap and adapted to permit of the collapse of the mold, means for supporting the mold sections, and means whereby the ends of the beam mold make joint with adjacent parts of the mold apparatus.

21. In mold apparatus for concrete bridge structures and the like, a box frame composed of sections, each section being composed of side, top and bottom members, the latter two being secured to side members, and third members having telescopic relation with the top and bottom members respectively and provided with attaching means providing a variable connection therebetween.

22. In mold apparatus for concrete bridge structures and the like, a box frame composed of sections, each section being composed of side, top and bottom members, the latter two being secured to the side members, and third members having telescopic relation with the top and bottom members respectively and provided with attaching means providing a variable connection therebetween, together with means for collapsing the sections toward each other.

23. In mold apparatus for concrete bridge structures and the like, a box frame composed of sections, each section comprising top and side and diagonal brace members, the latter having a plurality of apertures, a third member for connecting top members provided with means providing a variable connection therebetween, and a collapsing member connecting the diagonals and adapted to be connected thereto through the medium of any of the apertures therein.

24. In mold apparatus for concrete bridge structures and the like, the combination of a frame including top and side sections pivoted together to permit of the section being canted, a side section being provided with means whereby it may be supported in various positions of vertical adjustment.

25. In mold apparatus for concrete bridge structures, the combination of a pair of spaced longitudinal supporting members, and a plurality of transverse supporting members, and means whereby said transverse members are supported from the longitudinal members in various positions of vertical adjustment.

26. In mold apparatus for concrete bridge structures, the combination of an overhead load supporting means, mold means carried thereby, and a traveller for handling the mold means, said beam having means whereby the traveller may be supported for movement thereon.

27. In mold apparatus for concrete bridge structures and the like, having columns, the combination of longitudinally extended supporting means between the columns, take down mold sections, and a traveller supported from movement from said means for handling the molds.

28. In mold apparatus for concrete bridge structures and the like, having columns, the combination of brackets about the columns, members extending longitudinally between the columns and adapted to be carried on said brackets, and mold means carried thereby.

29. In mold apparatus for concrete bridge structures and the like, the combination of supporting means forming part of a beam mold, box frames for molding the sides of the beam, and means for supporting the box frames carried by said supporting means for various positions of vertical adjustment.

30. In mold apparatus for concrete bridge structures and the like, the combination of a pair of supporting means forming part of a beam mold, box frames on either side of said means for forming the sides of the beams, and means carried by the said supporting means each adapted to form a support for a pair of box frames, said last means being mounted for vertical adjustment.

In testimony whereof I have hereunto signed my name.

CHRISTIAN BRYNOLDT.